(12) United States Patent
Burg et al.

(10) Patent No.: US 6,362,840 B1
(45) Date of Patent: Mar. 26, 2002

(54) METHOD AND SYSTEM FOR GRAPHIC DISPLAY OF LINK ACTIONS

(75) Inventors: Frederick Murray Burg, West Long Branch; Max S. Schoeffler, Old Bridge, both of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/166,802

(22) Filed: Oct. 6, 1998

(51) Int. Cl.[7] .................................................. G06F 3/00
(52) U.S. Cl. ........................ 345/835; 345/708; 345/808; 345/854; 345/862
(58) Field of Search ................................ 345/145, 326, 345/336, 339, 347, 348, 349, 357, 978, 705, 708, 709, 764, 808, 812, 822, 835, 839, 854, 856, 859, 861; 707/501, 501.1

(56) References Cited

U.S. PATENT DOCUMENTS

| | | | | |
|---|---|---|---|---|
| 5,655,093 A | * | 8/1997 | Frid-Nielsen | 345/326 |
| 5,784,056 A | | 7/1998 | Nielsen | 345/332 |
| 5,877,765 A | * | 3/1999 | Dickman et al. | 345/349 |
| 5,926,179 A | * | 7/1999 | Matsuda et al. | 345/145 X |
| 5,987,482 A | * | 11/1999 | Bates et al. | 707/513 |
| 5,995,102 A | * | 11/1999 | Rosen et al. | 345/339 |
| 6,018,345 A | * | 1/2000 | Berstis | 345/357 |
| 6,065,057 A | * | 5/2000 | Rosen et al. | 345/339 X |
| 6,088,707 A | * | 7/2000 | Bates et al. | 707/501.1 |

OTHER PUBLICATIONS

RFC1738, Dec. 1994, InterNic.
Turning a Cursor Into an Ad But Mainly Just for Laughs, The New York Times, p. G3, Aug. 20, 1998.
Ken Magel, "Is It Too Late to Put the User Back into HTML?", Internet Watch, p. 131–132, Dec. 1997.*
Walsum et al., "Feature Extraction and Iconic Visualization", IEEE, vol. 2, p. 111–119, Dec. 1997.*

* cited by examiner

Primary Examiner—Raymond J. Bayerl
Assistant Examiner—X. L. Bautista (57) ABSTRACT

A method and system for presenting an icon on a computer graphic display, the icon being responsive to the type of link area on the computer graphic display. The link area on the computer graphic display is described by link instructions embedded in display format instructions, such as HTML format documents. The visually representative icon is displayed when a cursor, such as that controlled by a mouse, is positioned over the link area. The link instructions support services types such as telephone services, facsimile services, financial services, video services, help services and game services. The link instructions for the new services are described in new URL types or through scripting tools such as Active-X or JAVA scripts. The icons provide a visual representation of the service such as a telephone for telephone services; a dollar sign for financial services; or a video screen for video services. Text and sounds are also provided with the visually representative icon to further illustrate the service type.

26 Claims, 10 Drawing Sheets

METHOD AND SYSTEM FOR GRAPHIC DISPLAY OF LINK ACTIONS

BACKGROUND OF THE INVENTION

1. Field of the Invention

This invention relates to the field of document and information display and more particularly to documents and information display such as Web Pages that are based on HTML format documents with the interactive display of those documents.

2. Description of Related Art

Hypertext Markup Language (HTML) documents, exchanged on the Internet, include embedded link instructions that rely on Uniform Resource Locators (URLs) to locate and identify resources on the Internet. Typically, HTML documents are located, loaded and displayed using browser applications that also provide Internet navigation support. When the browser displays the HTML document, the embedded URL link instructions define active areas on a computer graphic display. A user can select or activate those areas.

Browser applications recognize multiple existing URL types in HTML format documents with each URL type performing a different function. Existing UTRL types include http, ftp, mailto and others. As the Internet develops, new service types are being offered, such as telephony, and video entertainment. These new types of services are fundamentally different from existing types of URL services, and many of those new services will be implemented by using new URL types. However, regardless of the URL type, operating systems and browser applications typically identify all URL links on a Web page with blue colored text and display the cursor as a fist with an extended index finger.

Scripting tools are frequently used with HTML documents to enhance the display options for Web pages. These scripting tools are also used to enable new internet services such as telephony. However, even with new internet services, the scripting tools rely on the operating system and browser application to identify the services with blue colored text and display the cursor as a fist with an extended index finger.

Thus, there is a need to provide enhanced visual information for internet services.

SUMMARY OF THE INVENTION

The invention is directed to a computer method comprising the steps of creating a computer graphic display with a link area corresponding to link instruction by interpreting display format information, and responsive to a cursor entering the link area, presenting an icon on the computer graphic display, the icon visually representing a service that results from selecting the link area. In this manner, if telephone service results from selecting the link area, an icon such as a telephone is presented.

The invention is also directed to an article of manufacture, comprising a computer usable medium having computer readable program code means embodied therein for creating a computer graphic display, the computer readable program code means in the article of manufacture comprising program readable program code means for causing a computer to create the computer graphic display with a link area corresponding to link instruction by interpreting display format information. The article of manufacture also comprising program readable program code means for causing the computer to communicate with an operating system and a browser application to determine when a cursor enters the link area. The article of manufacture also comprising program readable program code means for causing the computer to communicate with the operating system and the browser application to present an icon on the computer graphic display, the icon visually representing a service that results from selecting the link area.

The invention is also directed to a computer system, comprising a server, which is connected to an individual computer by a communication network. The system performs the steps of the individual computer reading display format information, the display format information being stored on the server and having at least one link instruction; the individual computer creating a computer graphic display with a link area corresponding to the link instruction by interpreting the display format information; and responsive to a cursor entering the link area, the individual computer presenting an icon on the computer graphic display, the icon visually representing a service that results from selecting the link area.

The invention is also directed to a memory for storing data for access by an application program being executed on a data processing system, comprising a data structure stored in the memory, the data structure including information resident in a database used by the application program and including a plurality of data objects, each of the data objects containing display format information; link instructions, the link instructions comprising part of the display format information; and a plurality of visually representative icon objects, one icon object being related to each link instruction and visually representing the related link instruction.

The visually representative icons of the invention may represent telephone service; facsimile service; video service; game service; financial service and help service. Sounds or text that are descriptive of the service may also be presented. Display format information may be in the form of hypertext mark-up language documents.

DETAILED DESCRIPTION OF THE INVENTION

Figure 1:
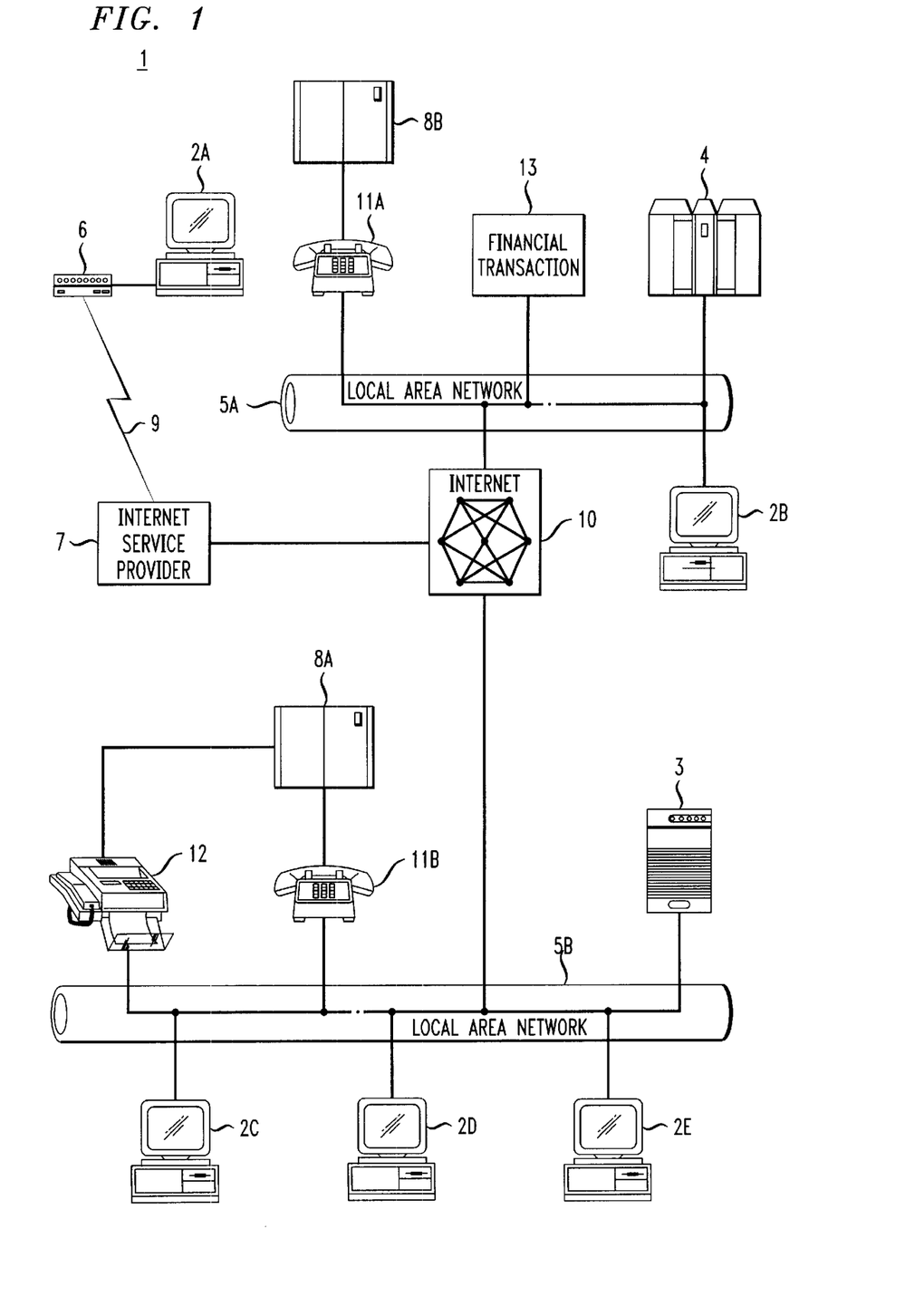
FIG. 1 illustrates one embodiment with the system comprising individual computers linked to each other via networks.

System 1 is illustrated at FIG. 1. Elements of system 1 include personal computers 2A, 2B, 2C, 2D, 2E; a minicomputer 3; a mainframe computer 4; local area networks 5A, 5B; a modem 6, an Internet service provider 7; telecommunication networks 8A, 8B; a telecommunication link 9; and the Internet 10. The system of the present invention also includes uniform resource locations (URLs) for telecommunication services 11A, 11B; facsimile services 12; and financial transaction services 13.

Personal computer 2A with associated modem 6, is linked to the Internet service provider 7, using a dial-up access protocol over telecommunication link 9.

Internet service provider 7 is linked to the Internet 10 and thereby provides personal computer 2A with electronic access to the Internet 10.

Local area network 5A is an Ethernet and is connected to personal computer 2B, mainframe 4, and the Internet 10. Local area network 5A is also connected to telecommunication services URL 11A and financial transaction services URL 13. Telecommunication services URL 11A is linked to telecommunication network 8B.

Local area network 5B is also an Ethernet and is connected to personal computers 2C, 2D, 2E; minicomputer 3; and the Internet 10. Local area network 5B is also connected to telecommunication services URL 11B; and facsimile services URL 12. Telecommunication services URL 11B and facsimile services URL 12 are both linked to telecommunication network 8A.

With the various local area networks, communication links and the Internet, personal computer 2A can electronically access any of the devices or services that are connected to local area networks 5A and 5B. Similarly, any of the personal computers 2C, 2D, 2E that are connected to local area network 5B can electronically access any of the devices or services that are connected to local area network 5A. In this manner, any of the devices or services that comprise system 1 are able to communicate or electronically access any of the other devices or services of system 1.

To enable the interconnections thus described, personal computers 2A, 2B, 2C, 2D, 2E each have central processors, memory, input/output devices, and computer graphic display devices. In a conventional manner, the personal computers load application programs from non-volatile memory, such as disk storage, into volatile memory such as Random Access Memory (RAM), where the instructions are executed by the central processor according to input/output instructions that operate on data contained in memory. Application programs for the personal computers include browser applications which load files from the memory of other devices in system 1. Browser applications interact with services 11A, 11B, 12, 13 in system 1.

Figure 2:
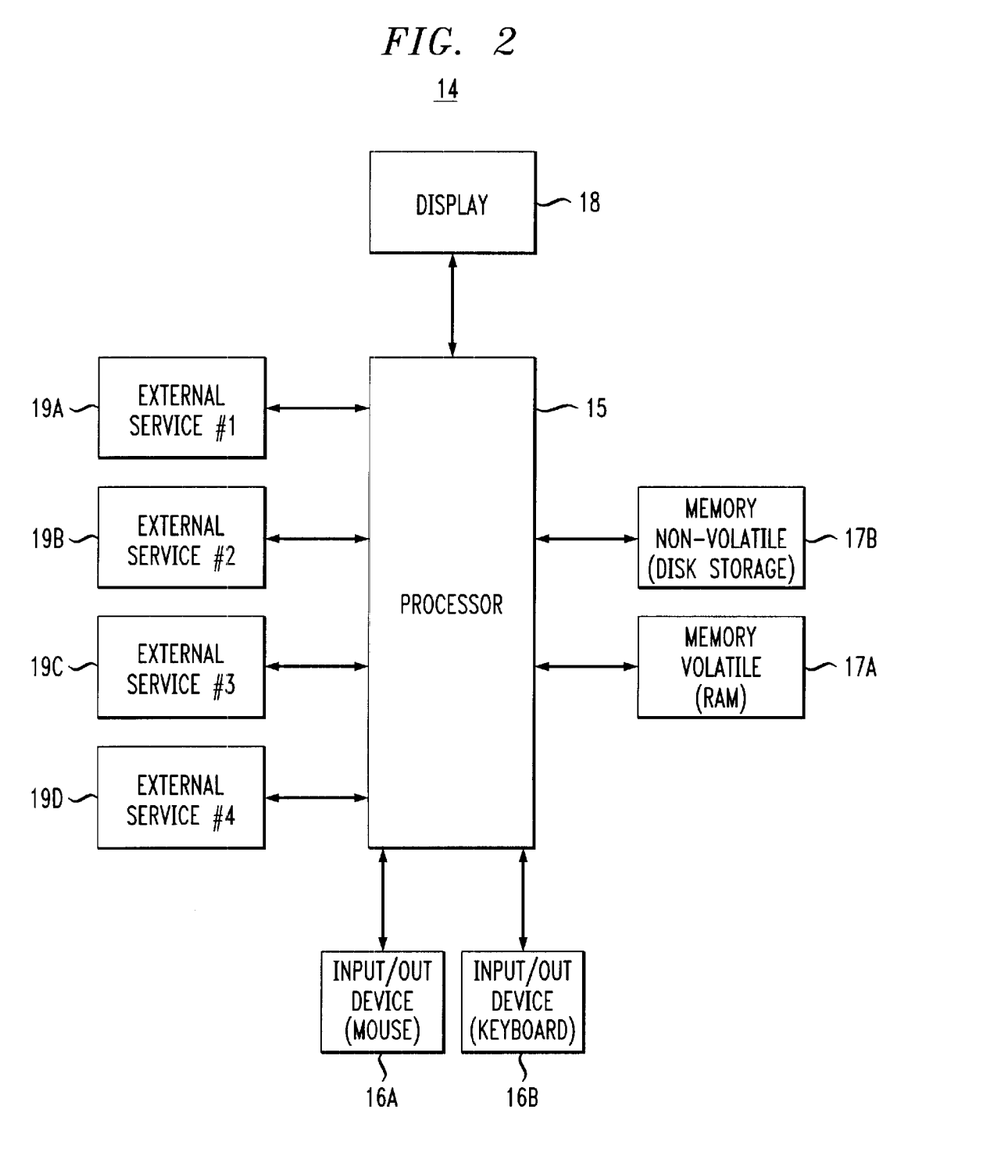
FIG. 2 illustrates another embodiment with the system comprising an individual computer.

FIG. 2 illustrates another embodiment. In this embodiment, system 14 is a personal computer or other type of smaller computer system, but system 14 does not require access to external networks or the Internet. System 14 comprises a central processor 15 connected to input and output devices such as a keyboard 16B and a mouse or pointing device 16A.

System 14 also comprises memory, that is connected to and addressable by CPU 15, such as non-volatile disk storage memory 17B and volatile RAM 17A. Application programs, application data and reference material are stored in disk storage 17B. CPU 15 loads application programs into RAM 17A where the application runs and operates on data in RAM 17A and disk storage 17B.

System 14 also comprises a computer graphic display device 18 that is used by CPU 15 as a graphical user interface (GUI) to the application program loaded in RAM 17A.

System 14 further comprises links between CPU 15 and external services 19A, 19B, 19C and 19D. External services provide enhanced capabilities such as telephone services 19A, financial services 19B, facsimile services 19C, and entertainment services 19D.

In the embodiment of FIG. 2, the browser application links to documents and services that are connected to or controlled by CPU 15. For example, the browser loads display format information in the form of an HTML file from memory 177B. The HTML format file includes link instructions to other HTML files in memory 177B. In this manner, the browser application of system 14 uses documents and files in the same manner that the browser of system 1 uses document and files. However, in system 14, the documents and files are resident within memory 17A and 17B. Similarly, CPU 15 links to external services 19A, 19B, 19C, 19D just as personal computer 2A, 2B, 2C, 2D or 2E in system 1 links to services 11A, 11B, 12, and 13. However, services 19A, 19B, 19C, 19D of system 14 are directly accessible, whereas in system 1, the services are accessible through networks 5A, 5B and 10.

Having thus described systems 1 and 14, the method used by systems 1 and 14 has a foundation in the World Wide Web (WWW, or the Web). The ability to easily communicate between computing devices that are connected to the Internet is one basis of the World Wide Web. The Web was conceived as a way for computer users to gain access to text or other information resources on the Internet, regardless of the type of hardware being used.

One problem associated with exchange of text documents over the Internet is the number of different text file formats produced by word processors. Most documents of interest are created and saved in a proprietary word processor format. These multiple formats result in significant information exchange incompatibilities. This lack of interoperability between text document formats is greatly alleviated by the adoption of HTML as the textual information exchange standard on the Internet.

HTML is a subset of SGML and provides platform and processor independent rendering of documents. One advantage of a standardized graphic markup language, such as HTML, is that text and graphic information is rendered virtually identically on any platform or operating system. Thus, a standardized graphic markup language, and HTML in particular, provides an excellent standard for exchange of text and graphic information. However, few word processors are HTML compliant and HTML text files, with embedded links and other formatting codes, are cumbersome and difficult to read or understand without experience.

Though some word processor packages are able to render HTML format files, word processors are generally unable to provide Internet navigation support. Browser applications fill this gap in capability by simultaneously rendering HTML format files and supporting Internet navigation. Browser applications are hardware and operating system specific and provide a graphical user interface to the Internet, in addition to providing other capabilities like book-marking Internet sites, and printing support. Browser applications are rapidly evolving and there are multiple browser applications that support many hardware and operating systems.

Figure 3:
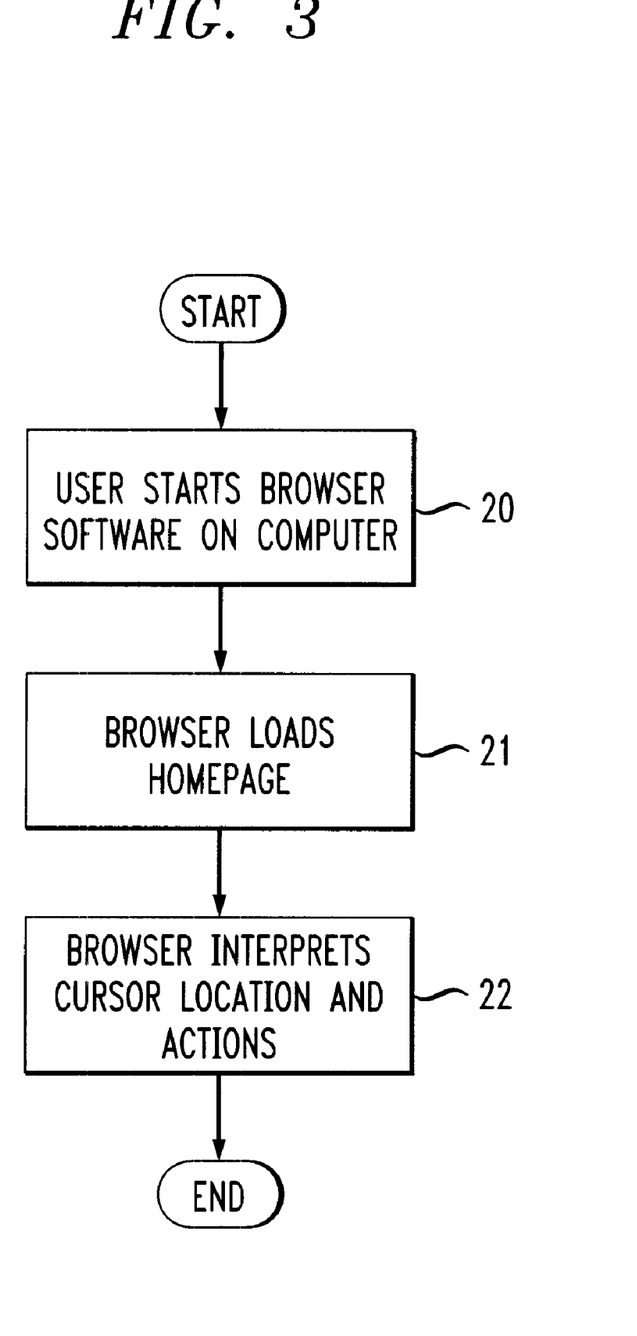
FIG. 3 illustrates a top level flow chart of browser application steps.

FIG. 3 illustrates the steps commonly performed by a browser application. In steps not illustrated for convenience, a user boots a computer such as personal computer 2A in system 1 of FIG. 1, and accesses the Internet via an Internet Service Provider 7. Though the following description uses system 1, system 14 performs similar steps.

At step 20, the user loads and starts the browser application on personal computer 2A of FIG. 1.

At step 21, the browser application locates, loads and interprets a file with display format information. This file is usually a document in HTML format and the display format information is encoded in the HTML formatting. For most browser applications, one particular HTML document is identified as the homepage. That HTML format document resides on the user computer, or it resides on another computer that is accessible to the user via the Internet.

At step 22, the browser application monitors and interprets the location of the cursor for the computer on the computer graphic display screen. The cursor is a moveable graphic indicator on the computer graphic display that is usually controlled by a mouse or trackball. As the user moves the mouse, the cursor moves on the computer graphic display and traverses different areas of the displayed document. Depending on the underlying area of the displayed document, at step 22, the browser application modifies the visual representation of the cursor.

Figure 4:
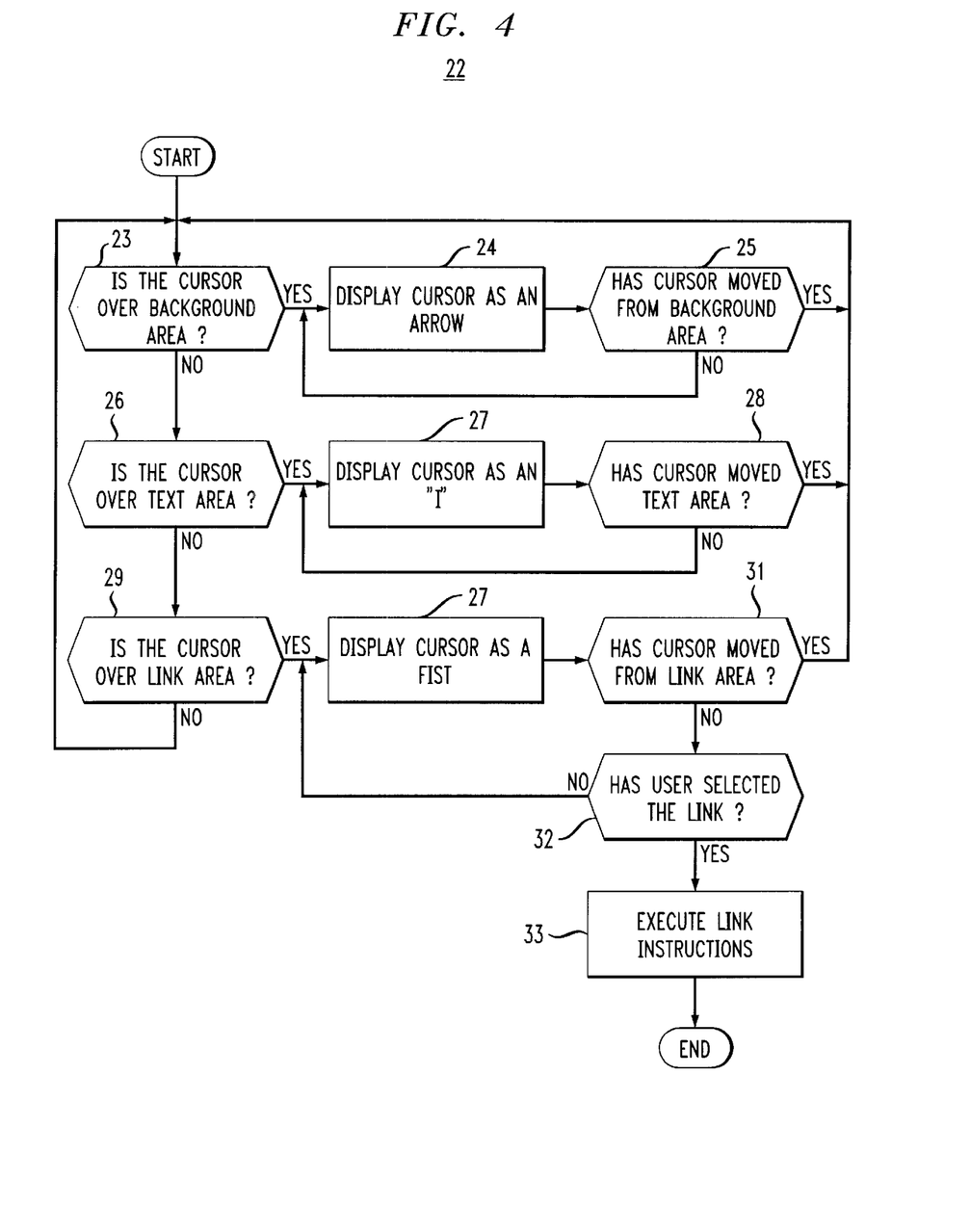
FIG. 4 illustrates a flow chart of browser application display steps.

There are at least three distinct area types on the display screen. One area type is background area, one area type is text area, and one area type is link area. Interpreting the cursor location and actions at step 22 includes a number of additional steps, some of which are illustrated in FIG. 4. The actions at step 22 are performed by the operating system and browser application in cooperation with each other.

At step 23 in FIG. 4, the browser determines whether the cursor is over a background area. The background area is usually formed without textual material. Typical background areas are colored panels and images. The background area can include an image of text, but the browser recognizes an image of text as a background area. If the cursor is not over a background area, the browser performs step 26.

Figure 8:
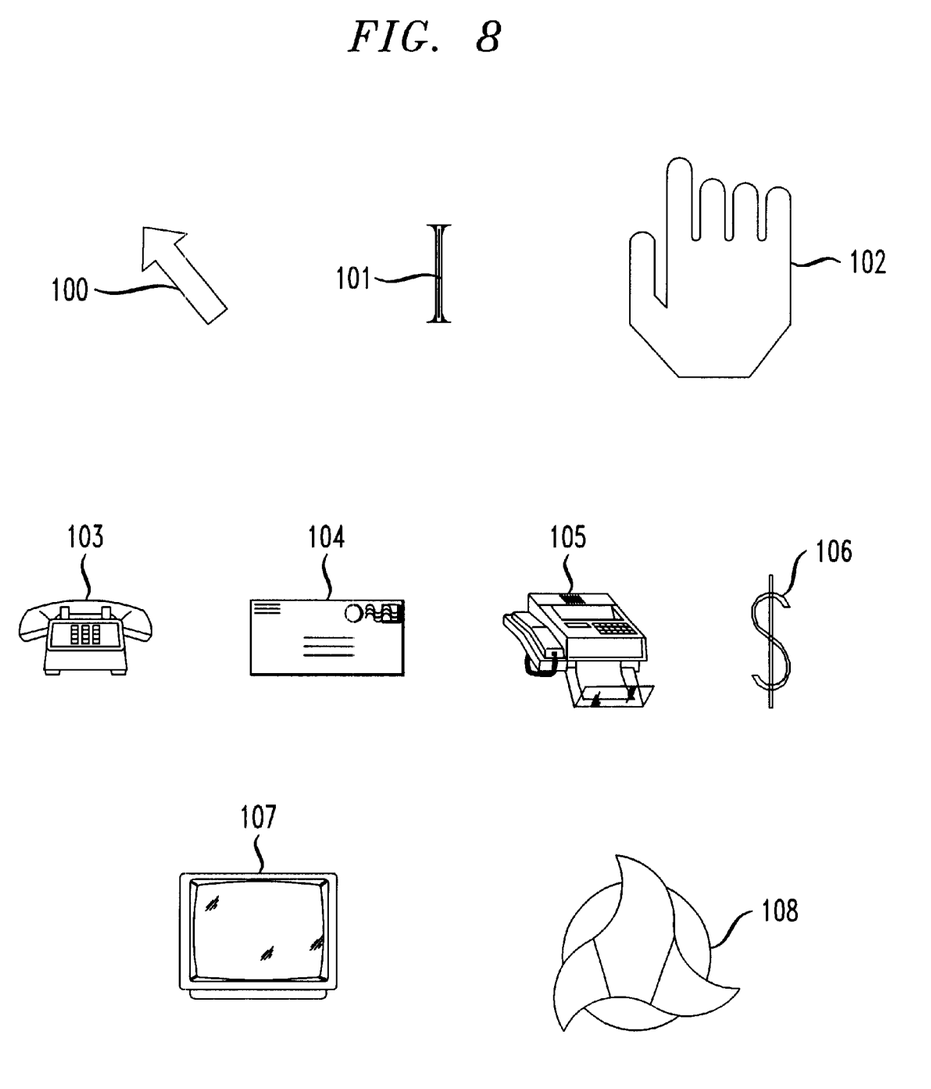
FIG. 8 illustrates generic and visually representative icons.

At step 24, if the browser application determines the cursor is over a background area, the browser application displays the cursor as an arrow, such as 100 in FIG. 8.

At step 25, the browser application loops until it determines that the cursor has moved off the background area.

After step 25, when the cursor moves off the background area, the browser application performs step 23.

At step 26, the browser application determines whether the cursor is over a text area. Text areas on the graphic display contain text material and retain the characteristics of text. For example, most browser applications can search text areas, and most browser applications will also allow a user to block sections of text and copy a section from the text area to a clip-board. If the cursor is not over a text area, the browser performs step 29.

At step 27, if the browser application determines the cursor is over a text area, the browser application displays the cursor as an "I" such as 101 in FIG. 8.

At step 28, the browser application loops until it determines that the cursor has moved off the text area.

After step 28, when the cursor moves off the text area, the browser application performs step 23.

At step 29, the browser application determines whether the cursor is over a link area. Link areas are the areas of the display screen that contain link instructions. The link area can be a section of text that is presented in a different color to identify it as a link area. The link area can also be an image, or part of an image. The link area can also be part of the display area that is visibly unremarkable from other areas of the computer graphics display. If the cursor is not over a link area, the browser returns to step 23.

At step 30, if the browser application determines the cursor is over a link area, the browser application displays the cursor as a closed fist with the index finger extended, such as 102 in FIG. 8.

At step 31, the browser application loops until it determines that the cursor has moved off the link area or the user has selected the link.

After step 31, when the cursor moves off the link area, the browser application performs step 23.

Of the three described areas on the display screen: background; text; and link areas, the link area is the only active area of the display. An active area means that user actions when the cursor is over the active area will cause the browser application to perform an action according to link instructions. A common user action is selecting the link area by clicking a mouse button.

At step 32, the browser application loops to determine whether the user has selected the link area.

At step 33, if the user selects the link area, the browser application performs the link instructions associated with the link area.

A common link instruction is to locate and load an HTML format document that is stored somewhere on the system. The protocol for this is called Hypertext Transfer Protocol (http).

The http protocol is one of several Uniform Resource Locators (URLs). The URL conventions encompass several standardized location names that are uniformly adopted within the Internet community. The present URL convention includes Hypertext Transport Protocol (http); File Transfer Protocol (ftp); Gopher (gopher); Wide Area Information Service (wais); Mail (mailto); and Net News Transfer Protocol (nntp). Each URL type provides a different type of action or service, and each URL type may constitute a link within an HTML format document.

Link areas in documents are usually associated with text. The text often describes the link area and resulting link action and most browser applications render link area text in a different color. Image objects and predefined areas on a display screen can also be link areas. For example an image on the computer graphic display can also be a link area. There does not need to be any associated text with the image to identify the image as a link area, or the resulting link action. A link area may also be a pre-defined geometric area on the display screen that is not visually distinct from any other area on the display.

Browser applications identify link areas in images by changing the depiction of the cursor when the cursor is over a link area to that of a fist with extended finger, such as 102 in FIG. 8. This browser action was described with reference to the flow charts in FIGS. 3 and 4.

When the HTML format document on the computer graphics display contains a link area with link instructions such as: <a href="mailto-johndoe@anywhere.com">, the browser application will launch an e-mail application and allow the user to complete a pre-addressed message to the designated e-mail address. Most web pages will identify a mailto URL link area with a suitable text label such as "e-mail to us." However, it is possible to create URL link areas without any text description. For example, an image of a flower on a computer graphic display can be a URL link area that launches the same e-mail instructions above. Thus, the browser application will alert the user that the flower is a URL link area by changing the cursor to a fist with extended finger when the cursor is over the flower. However, until the user actually selects the link area, they are unable to determine that the link area is of the mailto URL type.

It is envisioned that new types of services will be available through browser applications using HTML format documents. Examples of new types of services using the Internet are voice telephony, facsimile services, financial transactions, game services and video or television services. As these new types of services are available, additional information on the type of service is advantageous. One method to provide this additional information is through the use of visually representative icons that represent the type of service provided by activating or selecting the link area.

As used herein and in the claims an icon is a moveable graphic depiction on the computer display that moves in correspondence to the mouse or pointing device. A hand with extended finger such as 102 in FIG. 8 is an icon. However, the hand 102 in FIG. 8 is a generic icon because it does not provide a visual representation of the type of service. An icon is visually representative of the type of service when the icon itself brings to mind the service without the need for a text description. In this manner, because a telephone instrument brings to mind telephone service, a telephone instrument icon is visually representative of telephone service. Similarly, a television icon which brings to mind television service based on the icon alone is visually representative of television service.

As a further example, where link instructions in a link area will provide telephony services, the system displays an icon that visually represents telephone services when the cursor is over that link area. This icon is a telephone or handset or other visual representation that brings to mind telephone services. An example of a telephone icon which brings to mind telephone services is 103 in FIG. 8.

In another example, where the link instructions provide e-mail service, the cursor changes to an envelope icon, 104 in FIG. 8, when the cursor is over the link area. In this manner, before selecting the link, the user can visually determine that the cursor is over a link area and because the cursor changes to an icon of an envelope, the user is reminded of e-mail and thus knows that the type of link area is e-mail. Because the envelope icon is visually representative of e-mail service, the user does not need to rely on text to describe the link area as e-mail.

In another example, where the link instructions provide facsimile service, the cursor changes to a visually representative icon of a facsimile machine, 105 in FIG. 8, when the cursor is over the link area. In this manner, before selecting the link, the user can visually determine that the cursor is over a link area and because the cursor changes to an icon of a facsimile machine, the user is reminded of facsimile services and thus knows that the type of link area is facsimile service. Because the facsimile machine icon is visually representative of facsimile service, the user does not need to rely on text to describe the link area as facsimile services.

In another example, where the link instructions provide financial services, such as on-line payment, the cursor changes to a visually representative icon such as a $, 106 in FIG. 8, or a cash register when the cursor is over the link area. In this manner, before selecting the link area, the user can visually determine that the cursor is over a link area and because the cursor changes to an icon of a $ or a cash register, the user is reminded of financial services and thus knows that the type of link area is financial service. Because the $ icon is visually representative of financial service, the user does not need to rely on text to describe the link area as financial service.

Examples of visually representative icons for video services 107 and a Star Wars game service 108 are illustrated in FIG. 8.

As thus described, the visually representative icon is particularly helpful when the link area is defined by an image without text. The system changes the cursor to a visually representative icon when the cursor moves over the image, informing the user that the image is a link area. Additionally, because the icon is visually representative of the type of service, the icon reminds the user of that type of service. The user does not need to rely on text to inform her of the type of service offered by the link area.

In one embodiment, the invention is implemented with new UTRL types. In another embodiment, the invention is implemented with scripting tools, such as JAVA or ActiveX.

New URL Types

In this embodiment, each new service type has a distinct URL with a unique instruction set. For example, the new telephony service URL type is of the form: phone: field 1; field 2; field 3; . . . Here, field 1 is the access phone number for the telephone service; field 2 is the referring source, used to pay a referring commission on the telephone call; field 3 is the class of service advertised to ensure that the user is charged the same rate as quoted; etc.

Similarly, the new financial service URL type is of the form: payto: field 1; field 2; field 3 . . . This new URL type is appropriate for payment of goods and services that are ordered on the Internet. Here, field 1 is the payee name; field 2 is the payee account number which will be credited by the funds transfer; field 3 is a reference to the funds source, such as web page or vendor; etc.

New URL types are contemplated in RFC1738, the document that specifies the syntax and semantics for resources available via the Internet. RFC1738 is available on the Internet by ftp at: ftp://ds.internic.net/rfc/rfc1738.txt. RFC1738 also describes registration of new URL schemes and allows for experimental testing of new URLs before they are considered part of the full convention.

Figure 5:
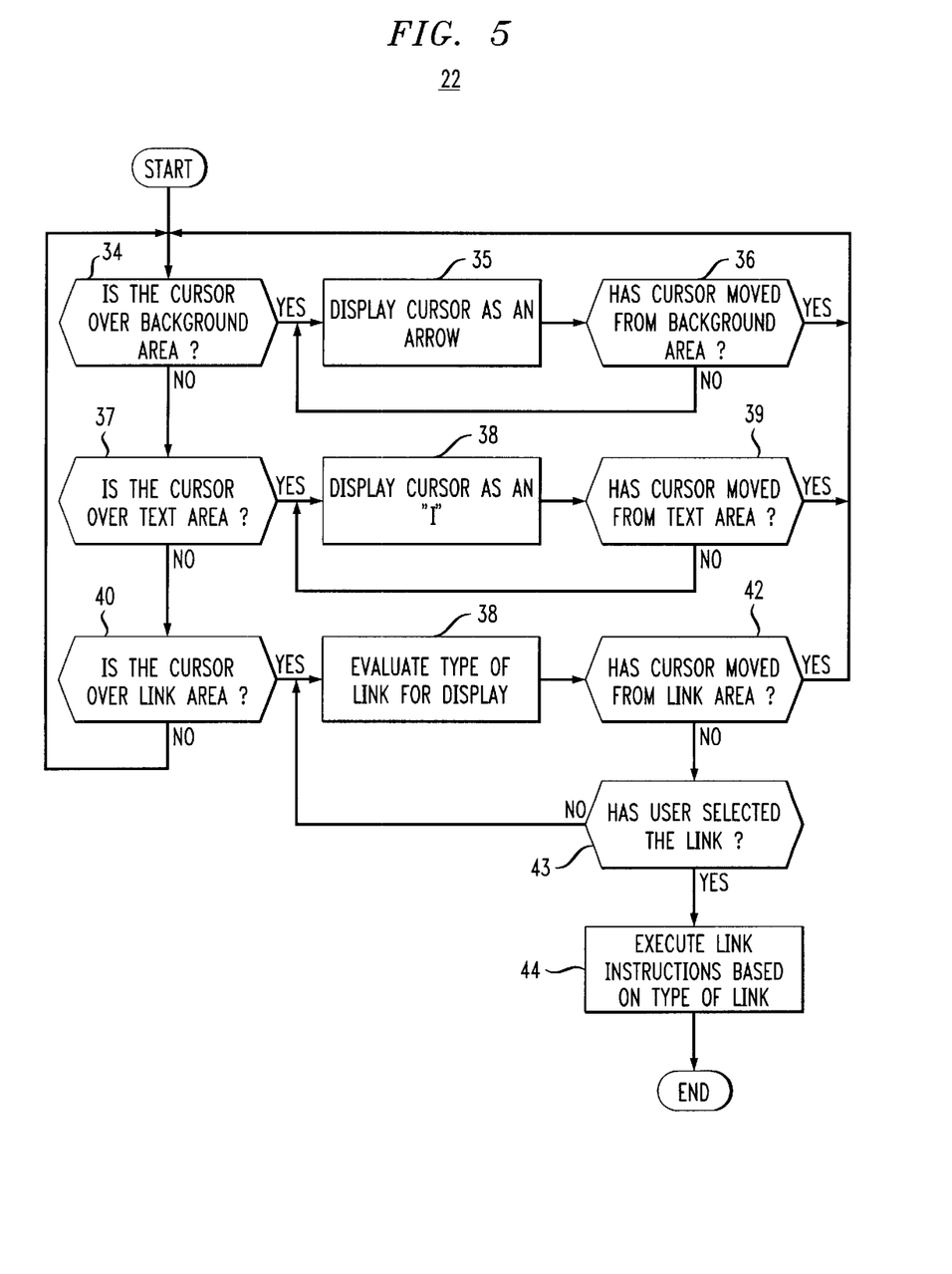
FIG. 5 illustrates a flow chart of browser application display steps in one embodiment.

FIG. 5 illustrates how the display of a browser application changes the cursor. At step 34, the browser application determines whether the cursor is over a background area. If the cursor is not over a background area, the browser application performs step 37.

At step 35, if the browser application determines the cursor is over a background area, the browser application displays the cursor as an arrow (100 in FIG. 8).

At step 36, the browser application loops until it determines that the cursor has moved off the background area.

After step 36, when the cursor moves off the background area, the browser application performs step 34.

At step 37, the browser application determines whether the cursor is over a text area. If the cursor is not over a text area, the browser application performs step 40.

At step 38, if the browser application determines the cursor is over a text area, the browser application displays the cursor as an "I" (101 in FIG. 8).

At step 39, the browser application loops until it determines that the cursor has moved off the text area.

After step 39, when the cursor moves off the text area, the browser application performs step 34.

At step 40, the browser application determines whether the cursor is over a link area. If the cursor is not over a link area, the browser application returns to step 34.

At step 41, the browser application evaluates the type of link for display. Step 41 includes additional steps which are described below in reference to FIG. 6.

At step 42, the browser application loops until it determines that the cursor has moved off the link area or the user has selected the link. After step 42, when the cursor moves off the link area, the browser application performs step 34.

At step 43, the browser application determines whether the user has selected the link area.

At step 44, the browser application executes the link instructions based on the type of link. Step 44 includes additional steps which are described below in reference to FIG. 7.

Figure 6:
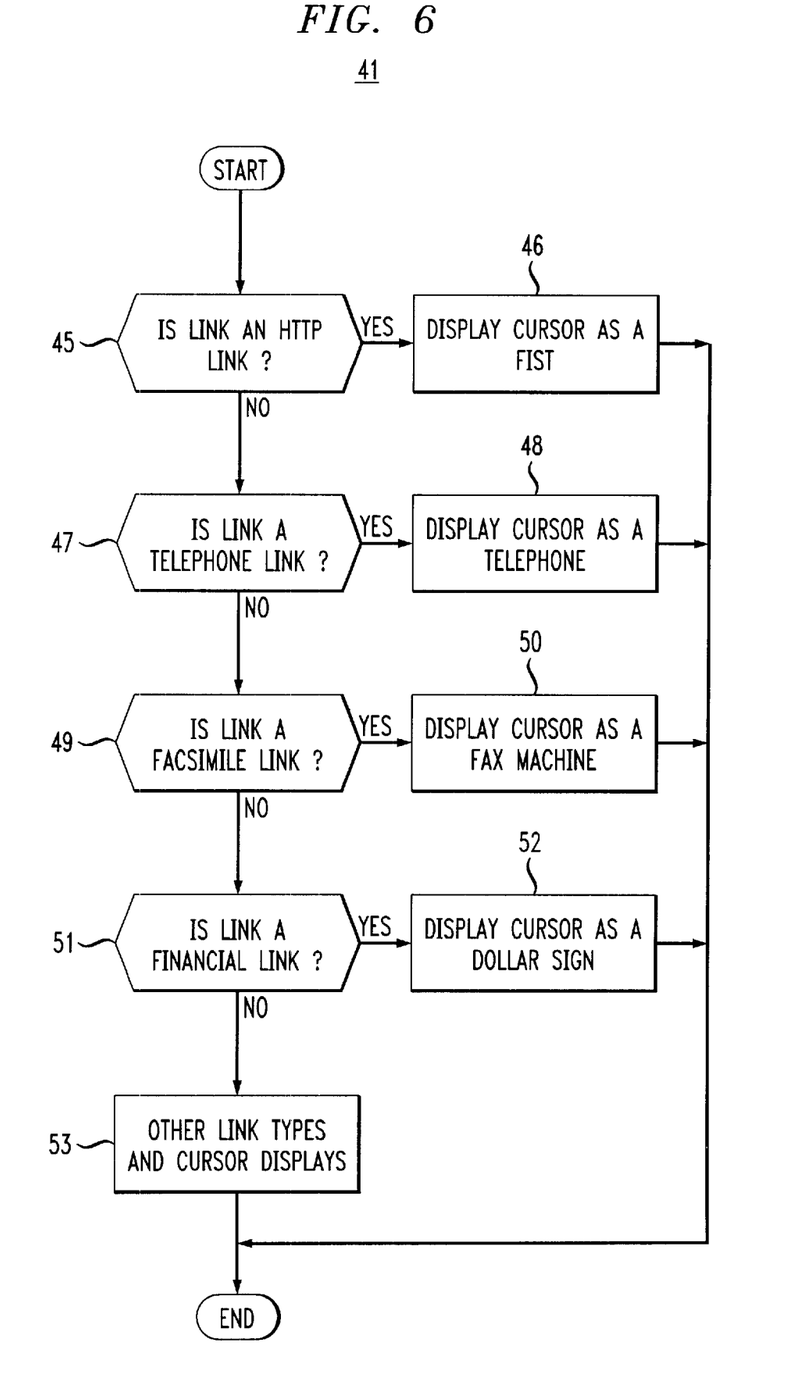
FIG. 6 illustrates a flow chart of browser application display steps in one embodiment.

FIG. 6 illustrates the additional steps performed at step 41 in FIG. 5.

At step 45, the browser application determines whether the link is an http URL link.

At step 46, if the link is an http link, the browser application displays an icon for the cursor as a fist with an extended finger (102 in FIG. 8).

At step 47, the browser application determines whether the link is a phone service link.

At step 48, if the link is a phone service link, the browser application displays a visually representative icon for the cursor as a telephone (103 in FIG. 8).

At step 49, the browser application determines whether the link is a facsimile service link.

At step 50, if the link is a facsimile service link, the browser application displays a visually representative icon for the cursor as a facsimile machine (105 in FIG. 8).

At step 51, the browser application determines whether the link is a financial service link.

At step 52, if the link is a financial service link, the browser application displays a visually representative icon for the cursor as a dollar sign (106 in FIG. 8).

At step 53, the browser application determines whether the link is another type of service link and displays the cursor as a visually representative icon of that service. Other types of service links include e-mail, entertainment, and television services. E-mail would be represented with a visually representative icon for the cursor as an envelope (104 in FIG. 8). A television service would be represented with a visually representative icon for the cursor as a television (107 in FIG. 8).

Figure 7:
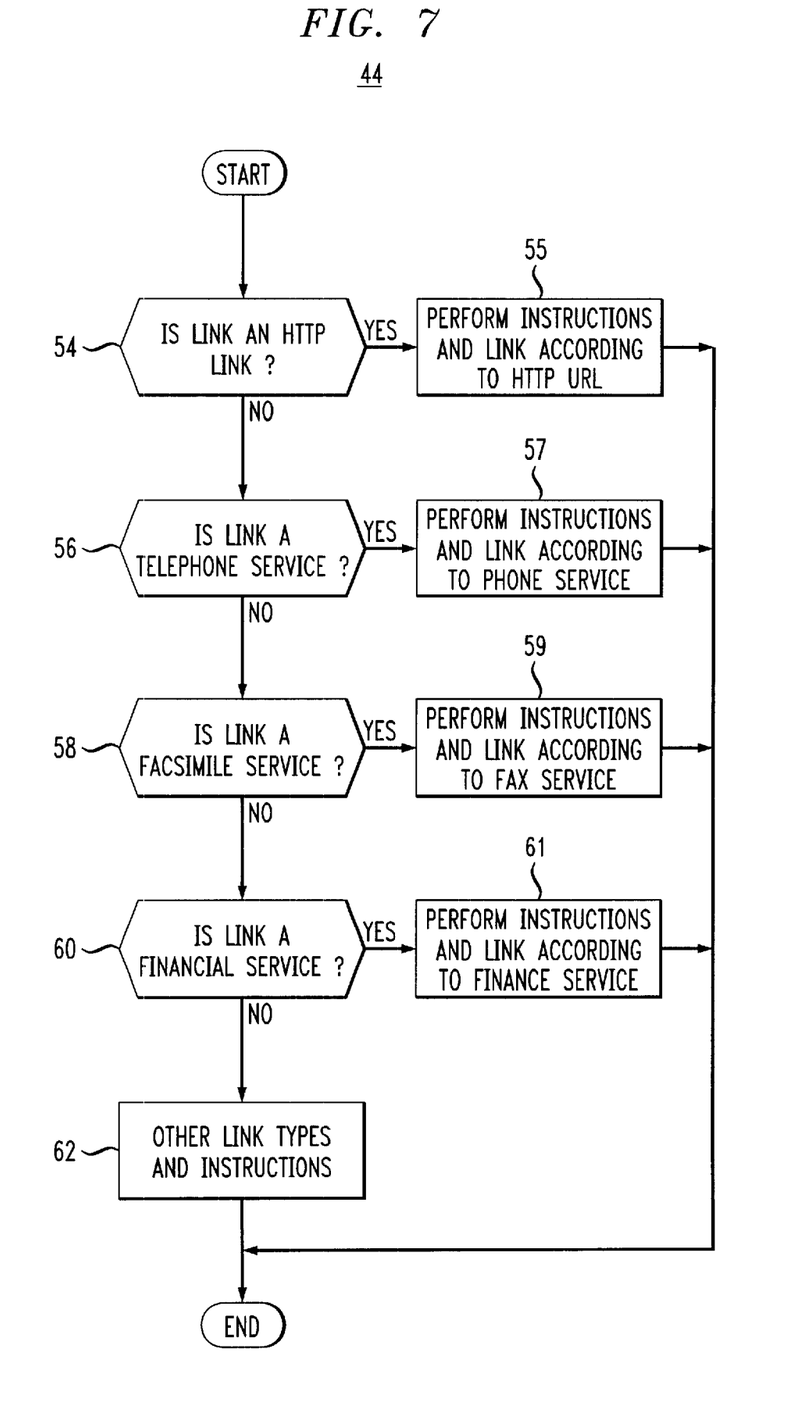
FIG. 7 illustrates a flow chart of browser application actions in one embodiment.

FIG. 7 illustrates the additional steps performed at step 44 in FIG. 5.

At step 54, the browser application detennines whether the link is an http URL link.

At step 55, if the link is an http URL link, the browser performs associated link instructions and links according to the http URL.

At step 56, the browser application determines whether the link is a phone service link.

At step 57, if the link is a phone service link, the browser application performs associated link instructions and links to the phone service.

At step 58, the browser application determines whether the link is a facsimile service link.

At step 59, if the link is a facsimile service link, the browser application performs associated link instructions and links to the facsimile service.

At step 60, the browser application determines whether the link is a financial service link.

At step 61, if the link is a financial service link, the browser application performs associated link instructions and links to the financial service.

At step 62, the browser application determines whether the link is another type of service link and performs associated link instructions and links to the respective service. For example, if the link is of the television video service type, the browser performs associated link instructions and links to the television video service.

Scripting Tools

In another embodiment, the system uses scripting tools such as JAVA, ActiveX, VBScript or Dynamic HTML. These scripting tools interact with the operating system and the browser application and can be used to capture mouse events and modify the cursor icon. The flow charts in FIGS. 9 and 10 illustrate a method to detect mouse events, display a visually representative icon and activate a service type.

Figure 9:
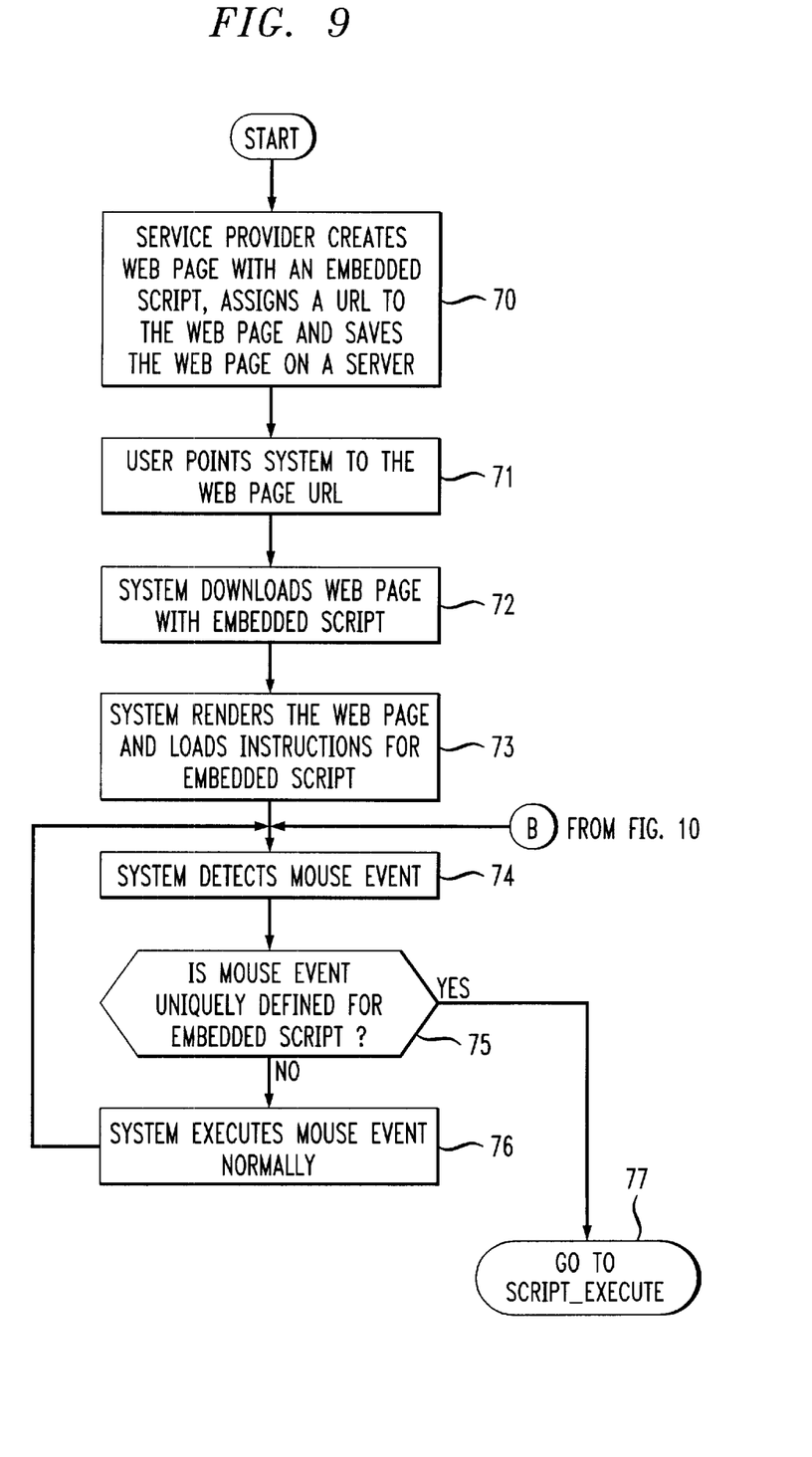
FIG. 9 illustrates a flow chart of one embodiment.
Figure 10:
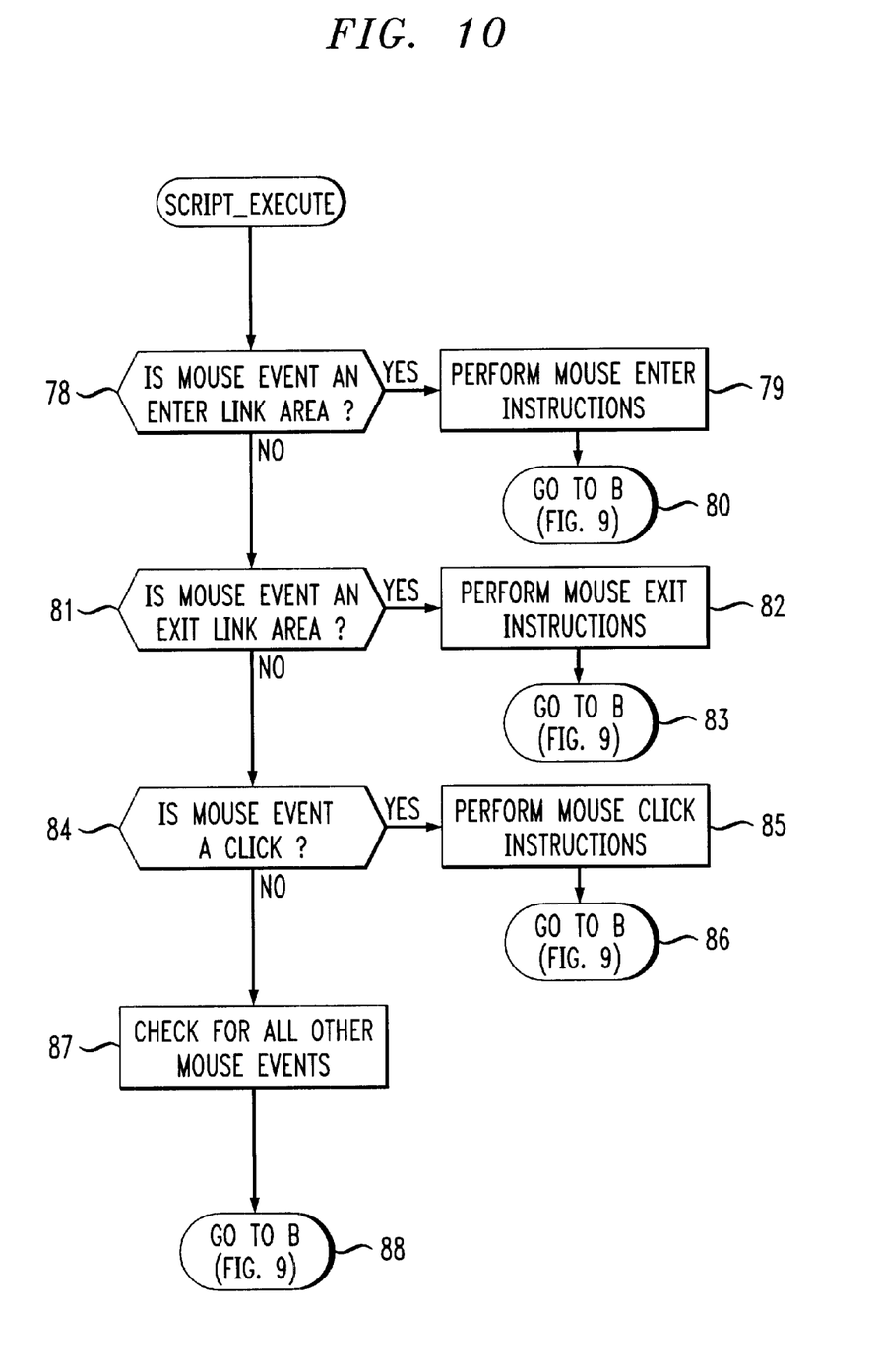
FIG. 10 illustrates a flow chart of one embodiment.

At step 70 in FIG. 9, a service provider creates a Web page with an embedded script for the service type, assigns a URL to the Web page and saves it on a server.

At step 71, a user points their browser application to the URL of the Web page. This can be through physically typing the desired URL, or it could be an http link from another Web page.

At step 72, the browser downloads the Web page with the embedded script from the server.

At step 73, the browser application renders the Web page and executes the embedded script instructions. The embedded script may be completely self contained, containing all the instructions necessary for the browser to provide a visually representative icon. Alternatively, the embedded script may instruct the system to execute new objects, such as DLL's that are downloaded only once, stored on the system and then immediately available on the system for subsequent use. Applets, and plug-ins are examples of objects that are downloaded and stored on the system. If the embedded script is self contained, the amount of information downloaded with the Web page is greater, but the visually representative icon can be highly customized or unique to a service type. If the embedded script uses objects that are downloaded and stored on the system, a library of icons can be downloaded once and then any one of the icons in the library can be easily displayed. This reduces the size of the Web page.

At step 74, the system detects a mouse event. Mouse events are any event involving the mouse or pointing device. Examples include movement of the mouse, pressing or release of a mouse button, entry of the mouse into a link area and exit of the mouse from a link area. Mouse events are captured by the operating system and browser application. The operating system and browser application, acting in cooperation, know the physical boundaries of link areas on the graphical display and also know the physical location of the cursor at all times. Using this information, the operating system and browser can determine when the cursor enters a link area and when the cursor exits a link area. The operating system and browser application similarly know when mouse buttons are pressed and can execute the proper instructions based on the cursor location at the when the buttons are pressed.

At step 75, the system determines whether the mouse event is uniquely defined for the embedded script.

At step 76, if the mouse event is not defined, the system executes the mouse event according to normal instructions.

At step 77, if the mouse event is uniquely defined for the embedded script, the system executes the steps illustrated in FIG. 10.

At step 78 in FIG. 10, the system determines whether the mouse event is an enter link area event.

At step 79, if the mouse event is an enter link area event, the system performs the mouse enter instructions. These instructions include changing the cursor to a visually representative icon of the service type. As previously described, the instructions may be completely self-contained within the embedded script, or the script may call objects already stored in system memory.

At step 80, after performing the mouse enter instructions, the system returns to step 74 in FIG. 9.

At step 81, if the mouse event is not an enter link area event, the system determines whether the mouse event is an exit link area event.

At step 82, if the mouse event is an exit link area event, the system performs the mouse exit instructions. These instructions typically change the cursor icon to an "I" (101 in FIG. 8) if the area is text, or an arrow (100 in FIG. 8) if the area is background.

At step 83, after performing the mouse exit instructions, the system returns to step 74 in FIG. 9.

At step 84, if the mouse event is not an exit link area event, the system determines whether the mouse event is a click event.

At step 85, if the mouse event is a click event, the system performs the mouse click instructions. These instructions execute the service type defined by the link area. As previously described, if the service type is telephony, the mouse click event would activate the telephony service type.

At step 86, after performing the mouse click instructions, the system returns to step 74 in FIG. 9.

At step 87, if the mouse event is not a mouse click event, the system checks for all other mouse events that are uniquely defined for the embedded script.

At step 88, the system returns to step 74 in FIG. 9.

In a specific implementation using ActiveX controls, the "normal" hyperlink is replaced with an ActiveX control, such as a text label form field. The text label form field attributes are set so as to display the desired text or image, with the desired appearance (color, underlining, positioning with respect to the text baseline of the surrounding text, etc.). One of the attributes is set to display a specified mouse icon when the mouse passes over the ActiveX control (i.e., the control is, in essence, a "window" within the browser window in which it appears).

The ActiveX control is incorporated into the Web page in which it is to appear using the "object" HTML tag. One of the parameters that modifies this tag identifies the specific ActiveX control that this object represents by means of a Globally Unique Identifier (GUID), a 128-bit integer that is guaranteed to be unique to this specific ActiveX control in any context. Another of the modifying parameters is a so-called "data source," a long string of ASCII text that encodes all the attributes to be associated with this instance of the ActiveX control.

When the system loads a page, the browser seeks the presence of the ActiveX control on the client computer. The system uses the Windows registry for this purpose. If the ActiveX control is present in a Dynamic Link Library (DLL) file on the computer and is registered under its GUID in the Windows registry, the browser requests that the DLL be loaded into memory and the ActiveX control is then rendered in the browser's window. If the ActiveX control is not present, another modifying parameter, the "Code Base," denotes where the control is located for downloading.

When the mouse is clicked while over the control, the action is defined in a script (JavaScript or VBScript) that appears in the same Web page and that binds to the ActiveX control object through a "name" that appears as another modifying parameter for the object.

Web page editing tools, such as Microsoft's FrontPage98, are used to insert the desired ActiveX control. The editing tools are also used to modify the ActiveX control attributes through property sheets that can be accessed during the creation of the control for the page, and to designate the action when the mouse is clicked while over the control.

This allows more sophisticated actions or sequences of actions that may be required for new service types.

The system uses either "canned" ActiveX controls (controls that are installed on the system when one or another of Microsoft's applications are installed), or custom ActiveX controls.

Embodiments using URLs or scripting tools have been described. Telephone services, facsimile services, financial services and video services are described but other services are also appropriate with the present invention. For example, games services or help services can be represented by visually representative icons.

In another embodiment, text is displayed with the visually representative icon. As an example, when the cursor is positioned over a telephone service link, the cursor icon changes to a telephone and the browser application opens an associated text box that describes the telephone link action. With telephony services, the text box includes information on the service provider, the telephone service provider's trade name and the quoted class of service. This information may also be displayed in the status bar of the browser.

In another embodiment, sound or audio clips accompany the visually representative icon. As an example, when the cursor is positioned over a particular game service link, the cursor icon changes to an associated game emblem (108 in FIG. 8) and the browser application plays a short sound clip associated with the game.

Although illustrative embodiments, and various modifications thereof, have been described in detail herein with reference to the accompanying drawings, it is to be understood that the invention is not limited to these precise embodiments and the described modifications, and that various changes and further modifications may be effected therein by one skilled in the art without departing from the scope or spirit of the invention as defined in the appended claims.

That which is claimed is:

1. A computer method comprising the steps of:
   creating a computer graphic display with one or more link areas, each particular link area corresponding to a specific service that is provided in response to execution of a link instruction associated with the particular link area by interpreting a display format instruction, each link area on the graphic display corresponding to a service; and
   responsive to a cursor entering each particular link area, presenting an icon on the computer graphic display, the icon visually representing the specific service provided as a result of executing the link instructions associated with the particular link area if the particular link area is selected, such that a user interacting with the graphic display is informed of the service provided upon execution of a particular link prior to the link instruction associated with the particular link being executed and wherein the visual representation of the icon is uniquely associated with the service such that for each link area that provides a different service, a different icon is presented to the user which represents that different service.

2. The method of claim 1, further comprising the step of presenting text on the computer graphic display that is descriptive of the action that is to be performed if the particular link area is selected.

3. The method of claim 1, further comprising the step of producing sounds that are descriptive of the action that is to be performed if the particular link area is selected.

4. The method of claim 1, further comprising the step of executing the link instruction when the particular link area is selected.

5. The method of claim 1, wherein the display format information is stored in hypertext markup language format.

6. The method of claim 1, wherein the icon visually represents a telephone service.

7. The method of claim 1, wherein the icon visually represents a facsimile service.

8. The method of claim 1, wherein the icon visually represents a video service.

9. The method of claim 1, wherein the icon visually represents a game service.

10. The method of claim 1, wherein the icon visually represents a financial service.

11. The method of claim 1, wherein the icon visually represents a help service.

12. A computer method comprising the steps of:
creating a computer graphic display with one or more link areas, each particular link area corresponding to a specific service that is provided in response to execution of a link instruction associated with the particular link area, each link area on the graphic display corresponding to a service;
communicating with an operating system and a browser application to determine when a cursor enters a particular link area; and
communicating with the operating system and the browser application to process an icon on the computer graphic display, the icon visually representing the specific service provided as a result of executing the link instructions associated with the particular link if the particular link area is selected, such that a user interacting with the graphic display is informed of the service provided upon execution of a particular link prior to the link instruction associated with the particular link being executed wherein the visual representation of the icon is uniquely associated with the service such that for each link area that provides a different service, a different icon is presented to the user which represents the different service.

13. The method of claim 12, further comprising the step of executing the link instruction when the particular link area is selected.

14. The method of claim 12, wherein the icon visually represents a telephone service.

15. An article of manufacture, comprising:
a computer usable medium having computer readable program code means embodied therein for creating a computer graphic display, the computer readable program code means in said article of manufacture comprising:
program readable program code means for causing a computer to create the computer graphic display with one or more link areas, each particular link area corresponding to a specific service that is provided in response to execution of a link instruction associated with the particular link area, each link area on the graphic display corresponding to a service;
program readable program code means for causing the computer to communicate with an operating system and a browser application to determine when a cursor enters the particular link area; and
program readable program code means for causing the computer to communicate with the operating system and the browser application to present an icon on the computer graphic display, the icon visually representing the specific service provided as a result of executing the link instruction associated with the particular link if the particular link area is selected, such that a user interacting with the graphic display is informed of the service provided upon execution of a particular link prior to the link instruction associated with the particular link being executed and wherein the visual representation of the icon is uniquely associated with the service such that for each link area that provides a different service, a different icon is presented to the user which represents the different service.

16. The article of manufacture of claim 15, further comprising program readable program code means for causing the computer to execute the link instruction when the particular link area is selected.

17. The article of manufacture of claim 15, wherein the icon visually represents a telephone service.

18. An article of manufacture, comprising:
a computer usable medium having computer readable program code means embodied therein for creating a computer graphic display, the computer readable program code means in said article of manufacture comprising:
program readable program code means for causing a computer to create the computer graphic display with one or more link areas, each particular link corresponding to a specific service that is provided in response to execution of a link instruction associated with the particular link area, each link area on the graphic display corresponding to a service;
program readable program code means for causing the computer to determine when a cursor enters the particular link area; and
program readable program code means for causing the computer to present an icon on the computer graphic display when the cursor enters the particular link area, the icon visually representing the specific service provided as a result of executing the link instruction associated with the particular link if the particular link area is selected, such that a user interacting with the graphic display is informed of the service provided upon execution of a particular link prior to the link instruction associated with the particular link being executed and wherein the visual representation of the icon is uniquely associated with the service such that for each link area that provides a different service, a different icon is presented to the user which represents the different service.

19. The article of manufacture of claim 18, further comprising program readable program code means for causing the computer to execute the link instruction when the particular link area is selected.

20. The article of manufacture of claim 18, wherein the icon visually represents a telephone service.

21. A computer system, comprising:
a server, which is connected to an individual computer by a communication network, the system performing the steps of:
the individual computer reading display format information, the display format information being stored on the server and having at least one link instruction;
the individual computer creating a computer graphic display with one or more link areas, each particular link area corresponding to a specific service that is provided in response to execution of the link instruction associated with the particular link area, each link area on the graphic display corresponding to a service; and responsive to a cursor entering the particular link area, the individual computer presenting an icon on the computer graphic display, the icon visually representing the specific service provided as a result of executing the link instruction associated with the particular link if the particular link area is selected such that a user interacting with the graphic display is informed of the service provided upon execution of a particular link prior to the link instruction associated with the particular link being executed, and wherein the visual representation of the icon is uniquely associated with the service such that for each link area that provides a different service, a different icon is presented to the user which represents the different service.

22. The system of claim 21, wherein the icon visually represents a telephone service.

23. A computer system, comprising:
 a display device;
 a data storage area;
 a cursor; and
 a processor coupled to the display device, the data storage area and the cursor, the system being controlled by the processor and performing the steps of:
  reading display format information from the data storage area, the display format information having at least one link instruction;
  creating a computer graphic display on the display device with one or more link areas, each particular link area corresponding to a specific service that is provided in response to execution of the link instruction associated with the particular link area by interpreting the display format information, each link area on the graphic display corresponding to a service; and
  responsive to the cursor entering the particular link area, the processor presenting an icon on the computer graphic display, the icon visually representing the specific service provided as a result of executing the link instruction associated with the particular link if the particular link area is selected, such that a user interacting with the graphic display is informed of the service provided upon execution of a particular link prior to the link instruction associated with the particular link being executed and wherein the visual representation of the icon is uniquely associated with the service such that for each link area that provides a different service, a different icon is presented to the user which represents the different service.

24. The system of claim 23, wherein the icon visually represents a telephone service.

25. A computer method comprising the steps of:
 creating a computer graphic display with a telephone service link area corresponding to a telephone link instruction to place a telephone call by interpreting display format information that is in hypertext mark-up language format;
 responsive to a cursor entering the telephone service link area, presenting an icon on the computer graphic display, the icon visually representing the placement of a telephone call that results from selecting the telephone service link area; and
 executing the telephone link instruction when the telephone service link area is selected resulting in the placement of a telephone call according to the executed link instruction.

26. A memory for storing data for access by an application program being executed on a data processing system, comprising:
 a data structure stored in said memory, said data structure including information resident in a database used by said application program and including:
  a plurality of data objects, each of the data objects containing display format information;
  link instructions, the link instructions comprising part of the display format information and corresponding to a service that is provided in response to execution of the link instructions, each link area on the graphic display corresponding to a service; and
  a plurality of visually representative icon objects, one icon object being related to each link instruction and visually representing a specific service provided as a result of executing the related link instruction, the related link instruction being associated with a particular link area, such that a user interacting with the link areas is informed of the service provided upon execution of a particular link prior to the link instructions associated with the particular link being executed wherein the visual representation of each icon object is uniquely associated with the service such that for each link area that provides a different service, a different icon object is presented to the user which represents the different service.

* * * * *